United States Patent

Rouse

[15] 3,688,271

[45] Aug. 29, 1972

[54] METHOD AND APPARATUS FOR TRANSMITTING UTILITY METER DATA TO A REMOTE MOBILE COMMAND UNIT

[72] Inventor: Donald W. Rouse, Palmyra, N.Y.

[73] Assignee: Readex Electronics, Inc., Honeoye Falls, N.Y.

[22] Filed: Aug. 10, 1970

[21] Appl. No.: 62,319

[52] U.S. Cl. ....................340/172.5

[51] Int. Cl. ....................G06f 15/30, G08c 25/00

[58] Field of Search ....................340/172.5; 235/157

[56] References Cited

UNITED STATES PATENTS

| | | | |
|---|---|---|---|
| 3,400,378 | 9/1968 | Smith et al. | 340/172.5 |
| 3,266,018 | 8/1966 | Higgins | 340/172.5 |
| 3,281,789 | 10/1966 | Willcox et al. | 340/172.5 |
| 3,436,732 | 4/1969 | Charters | 340/172.5 |
| 3,407,387 | 10/1968 | Looschen et al. | 340/172.5 |
| 3,374,461 | 3/1968 | Anderholm et al. | 340/172.5 |
| 3,297,994 | 1/1967 | Klein | 340/172.5 |
| 3,406,387 | 10/1968 | Werme | 340/172.5 |

*Primary Examiner*—Gareth D. Shaw
*Assistant Examiner*—Mark Edward Nusbaum
*Attorney*—Shlesinger, Fitzsimmons & Shlesinger

[57] ABSTRACT

The readings recorded by the utility meters in a household or other building are continuously converted and stored in a unit in the building in the form of transmittable binary data signals. The units in different buildings have a different binary identifying code. A mobile command station intermittently transmits to all building units in its command different codes, only one of which corresponds to the identifying code of a given building unit. Each transmitted code is compared simultaneously at each building unit with the latter's identifying code. When the codes compared at a given building unit agree, that building unit transmits its stored data signals for recording at the command unit.

16 Claims, 4 Drawing Figures

INVENTOR.
DONALD W. ROUSE

BY

Shlesinger, Fitzsimmons & Shlesinger
ATTORNEYS

INVENTOR.
DONALD W. ROUSE
BY
Schlesinger, Fitzsimmons & Schlesinger
ATTORNEYS

INVENTOR.
DONALD W. ROUSE

BY

Shlesinger, Fitzsimmons & Shlesinger

ATTORNEYS

INVENTOR.
DONALD W. ROUSE

BY *Schlesinger, Fitzsimmons & Schlesinger*

ATTORNEYS

METHOD AND APPARATUS FOR TRANSMITTING UTILITY METER DATA TO A REMOTE MOBILE COMMAND UNIT

This invention relates to remote meter reading apparatus, and more particularly to a method and apparatus for selectively transmitting household utility meter data from meter units to a remote mobile command unit.

Heretofore it has been customary for utility companies to employ meter readers, for billing purposes, periodically to enter customers' premises to read the electric, gas and water meters, to determine the quantities of these products consumed since the last billing date. Because this manual examining operation is costly and time consuming, and because, not infrequently the householder is away, and the premises are closed, and the meter reader therefore cannot read the meter, efforts have been made to develop means for automatically reading and recording utility meter data from a command location remote from the meters.

The reading of utility meters from a remote point is complicated by the fact that the data from the meters of each individual household must, for proper billing purposes, be distinguishable from the utility data from other households that are being queried by the command unit. One way that this separation can be achieved is to interrogate different households successively, so that the command unit will receive data from only one household at a time.

It is an object of this invention to provide an improved method and apparatus for rapidly and successively monitoring a plurality of remote utility meter units from a single, mobile command unit.

A further object of this invention is to provide remote meter reading apparatus, which is capable of rapidly reading and recording at a central command point the data developed from the utility meters of hundreds of thousands of utility customers.

Another object of this invention is to provide apparatus of the type described which utilizes a single, mobile command unit, which is linkable by radio frequency signals to a vast number of utility meters, and which is capable of rapidly and successively determining and recording the latest data from these meters.

A more specific object of this invention is to provide for apparatus of the type described, means for selectively linking the utility meters of any one household out of hundreds of thousands of different households or customers with a mobile command unit in order selectively to transmit data from the utility meters of a given household to the command unit.

Other objects of the invention will be apparent hereinafter from the specification and from the recital of the appended claims, particularly when read in conjunction with the accompanying drawings.

Figure 1:
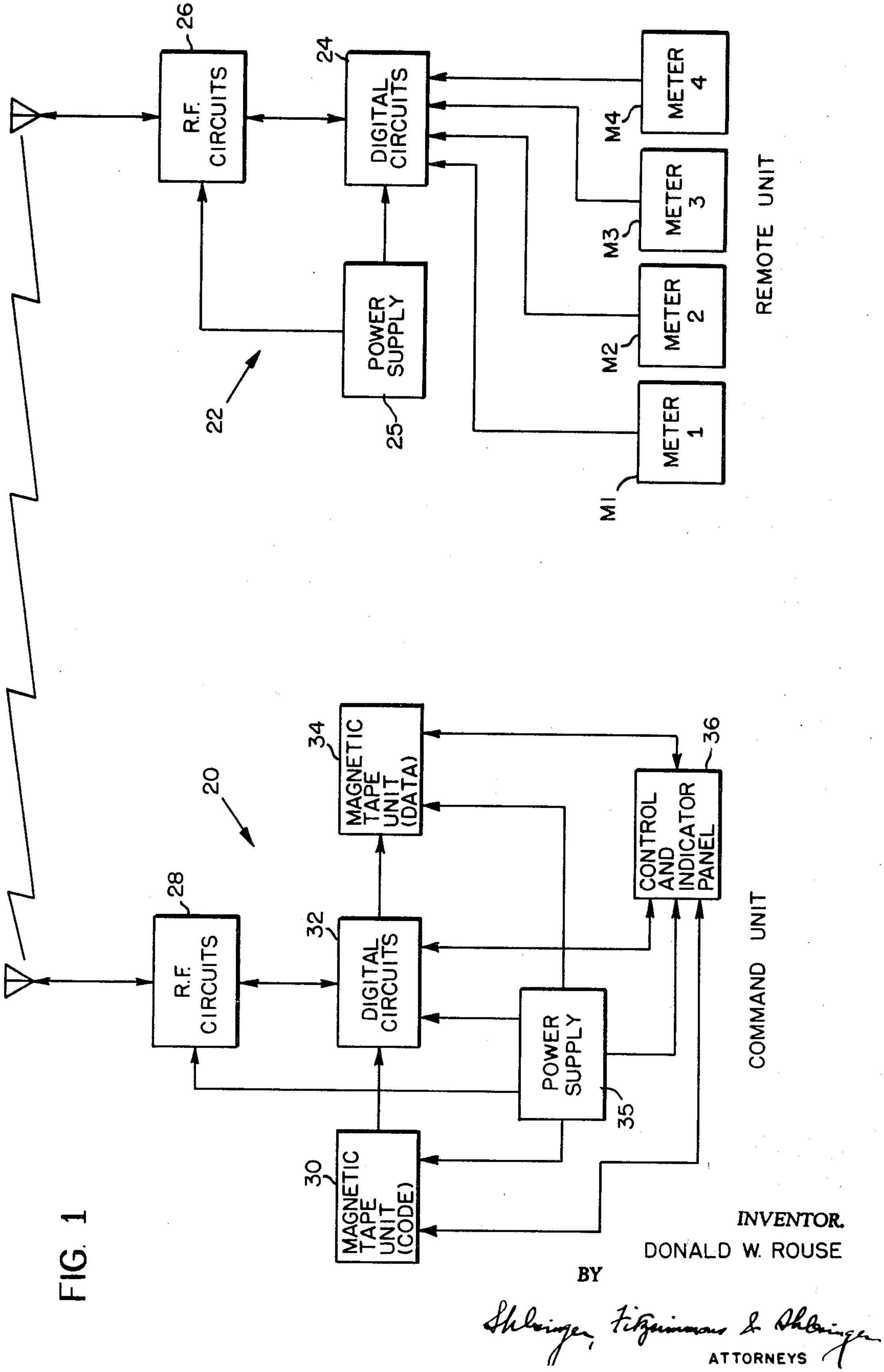
FIG. 1 is a schematic representation, in block form, of a remote meter reading command unit made in accordance with one embodiment of this invention, and illustrating also in block form, one of the utility meter units which is linked to the command unit by radio frequency signals.

Referring now to the drawings by numerals of reference, and first to FIG. 1, 20 denotes generally a typical command and recording unit, which a utility company, for example, may establish in a metropolitan area for the purpose of periodically monitoring the utility meters of its customers; and 22 designates generally a meter unit such as may be installed in each home, office building, etc. serviced by the utility, and incorporating the usual meters M1, M2, M3 and M4 for recording, for example, the amounts of gas, electricity, water, steam, etc. consumed by the customer.

As the pointer or indicator of each meter in unit 22 advances in response to the consumption of a particular utility, it develops, by conventional means, an output signal which is applied to a digital control device 24. Control device 24 is connected to a combination transmitting and receiving device 26 for communicating by radio frequency signals with a further transmitting and receiving device 28 located at the command unit 20. These transmitting and receiving devices may be, for example, Johnson Model 242–550–001 two-way radios (see May 1969 Johnson Corporation Service Manual for Johnson FM two-way radio Model 242–550). Unit 22 has its own power supply 25, which may include a conventional storage battery.

The command unit 20 includes a magnetic tape unit 30, which may be a Model No. 344 manufactured by Dicom Industries, and disclosed in its brochure, which was available prior to August 1970, describing the Cassette Magnetic Tape Operating System for Hewlett-Packard No. 2114, 2115, 2116 Series Computers (page 104 of H.P. Catalogue of 1969) for storing a plurality of identifying codes, which may be selected by a digital control device 32 for transmission selectively by unit 28 to a remote unit 22 to query that unit. Each remote unit 22 is set to transmit its meter data only when it receives a predetermined radio frequency code signal from the command unit 20. When the proper identifying code signal is received, the remote unit 22 transmits the latest readings of its meters M1, M2, M3 and M4 to the command unit 20, where it is recorded by a magnetic tape unit 34. The control unit 20 may also include a control and indicator panel 36 for providing visual indications of the operational sequences. Unit 20 also has its own power supply 35. Elements 32 and 36 of unit 20 may, for example form part of a mini-computer of the type manufactured by Hewlett-Packard, Model No. 2114A, and a teleprinter manufactured by Teletype Corp. as Model No. ASR–33, modified and sold by Hewlett-Packard as H.P. No. 2752A (page 109 of H. P. Catalogue).

Figure 2A:
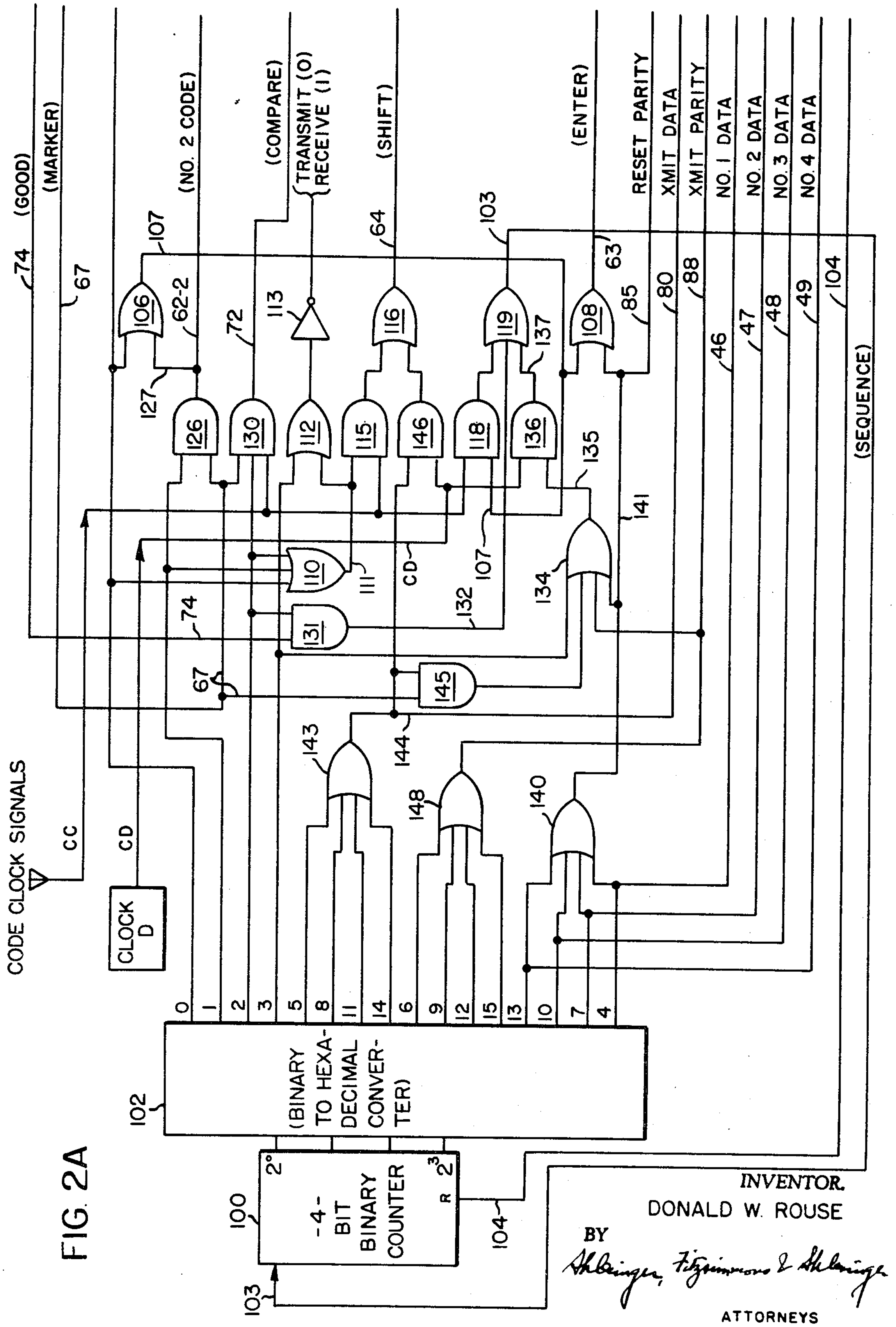
FIGS. 2A and 2B are wiring diagrams illustrating together one type of digital control device, which may be installed at each meter unit selectively to link the utility meters of the unit to the command unit.
Figure 2B:
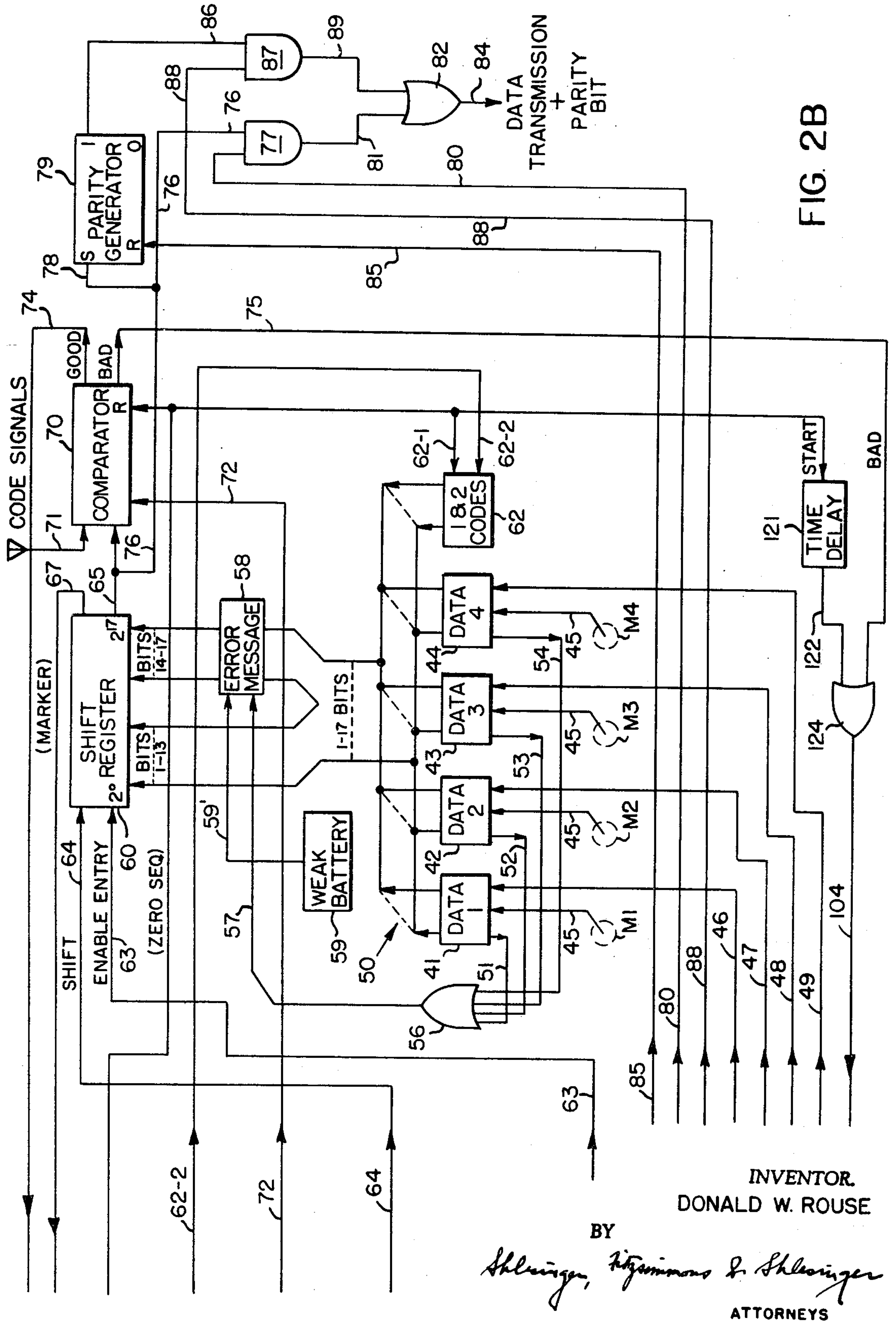

FIGS. 2A and 2B illustrate in detail a typical digital control device 24, forming part of a unit 22 to control its response to signals from unit 20. The device 24 comprises four data counters 41, 42, 43 and 44 (FIG. 2B), which function as totalizers and data storage devices. These counters have serial inputs separately connected as at 45 to the outputs of the utility meters M1, M2, M3 and M4, respectively. As noted above, the output of each utility meter comprises signals which are developed by a switch (not illustrated) in correspondence with the movement of the quantity indicator of the meter. For example, assuming that meter M1 is used to measure the consumption of gas, a signal will be developed on line 45 each time a cubic foot of gas is consumed. Similarly signals will be developed on the inputs 45 of the remaining counters 42, 43 and 44 each time a predetermined quantity of, for example, electricity, water or steam is measured by the associated meter M2, M3 and M4, respectively.

Each of the data counters 41 to 44 has a plurality of stages (seventeen in the instance illustrated), and is wired to record, in response to the signals received on its associated input 45, the binary equivalent of the decimal numbers 0 to 99,999, or in other words from zero to the binary number 11000011010011111. When one of the data counters reaches this maximum value for which it is wired, the next signal received on its input line 45 causes the counter to be reset to zero.

The transfer of data from the counters 41, 42, 43 and 44 occurs, one counter at a time, and is controlled for each counter by enabling or data transfer signals, which are developed as hereinafter described on lines 46, 47, 48 and 49, respectively. When a transfer signal appears on one of these lines, the reading of the associated counter is transferred in parallel onto 17 data bus lines denoted generally at 50 in FIG. 2B. This operation, of course, does not alter the counter reading. Each of the counters 41, 42, 43 and 44 also has an output line 51, 52, 53 and 54, respectively, which is connected through an OR gate 56 and line 57 to the input of an error message device 58. The output of a device 59 for monitoring the strength of a battery forming part of the power supply 25 of the unit, and for indicating when the battery power is low (weak), is also connected by line 59' to this error message device 58 for reasons noted hereinafter.

The seventeen bus lines 50 are connected, in part through the error message device 58, with the parallel input of a conventional eighteen stage shift register 60, so that when data is transferred from one of the data counters to the bus lines 50, the four most significant bits (14 to 17) of this data are applied through the error message device 58 to the last four stages in the shift register 60, while the first 13 bits of the transferred data are applied directly to stages one through 13 of the shift register input. The first or "zero" bit of the register 60 is not connected to any of the bus lines 50.

The reason for interposing the error message device 58 between the data counters 41 to 44 and the shift register 60 is twofold. First, since the information stored in the counters 41 to 44 is transitory, a storage battery is used in each unit 22 to prevent destruction of stored data upon failure of the main power supply of the unit. The output of this battery is applied to the monitoring device 59, which develops and applies an error signal through line 59' to device 58, whenever the output of the battery becomes so weak that it must be recharged or replaced.

The second purpose of device 58 is to detect the possibility of a data input signal being developed on one of the input lines 45 at the instant that data is being transferred ("strobed") from the associated counter 41, 42, 43 or 44 to the shift register 60. Thus, if at the time that a data transfer signal appears on one of the lines 46 to 49, a data input signal also appears on the associated data input signal line 45, then the separate output line 51, 52, 53 or 54 will "go high", producing a signal which gates the OR element 56 to apply an error signal on line 57 to the unit 58.

As previously noted, the maximum binary representation, which any of the data counters is capable of holding (i.e. binary 11000011010011111 for the decimal number 99,999), includes a zero in each of its third and fourth most significant bits, or in other words in the bits 14 and 15 that are applied by the bus lines 50 to the input of the error message device 58. In the embodiment illustrated, the third, for example, of the most significant bits is replaced by a one, whenever a signal appears on line 57, to denote a counter update during data transfer; and whenever the output of the battery 59 falls below a predetermined value, the device 58 causes the fourth of the above-noted four most significant bits to be replaced by a one to indicate the presence of a weak battery. These coded error signals are noted at the command unit 20 when the data is transmitted thereto as described hereinafter. It will be understood, of course, that in the absence of either of these two error signals, the third and fourth most significant bits entered into the shift register 60 will always be zero.

Also having a seventeen bit output connected in parallel with the bus lines 50 is a code generator 62. This generator comprises a plurality of gates (not illustrated) which generate two codes, No. 1 and No. 2, each 17 bits in length. These two codes are separately and successively "strobed" or transferred in parallel onto the bus lines 50 upon receipt of enabling or code transfer signals on the input lines 62-1 and 62-2, respectively, of the generator. The first code transferred to the register 60 contains a one in its most significant bit position, while the second code contains a zero in its most significant bit position. These two codes, when considered together, represent a 34 bit code for a given unit 22, and serve both to identify the customer, and to trigger the hereinafter described data transmitting portion of unit 22, when they agree with the code being transmitted by the control unit 20. By using a total of 34 code bits for each unit 22, over a million different units may be identified each by a separate code; and by transferring the code of each unit 22 successively in two, 17 bit portions (codes No. 1 and No. 2) to register 60, the need for employing a 34 bit register at each unit 22 is obviated.

The shift register 60 (FIG. 2B) functions as a parallel to serial converter, in that, when an enabling signal appears on its input line 63, data can be entered in parallel from the bus lines 50 to the input of register 60; and when data shift signals appear at the input line 64, the data in the shift register 60 is shifted serially out of the register to its output line 65, most significant bit first. When the enabling or data entry signal appears on line 63, the leading edge of this signal causes a zero to be entered in the zero or lease significant stage of the register 60; and the trailing edge of this signal causes data bits to be transferred from the bus lines 50 to the remaining stages 1 through 17 of register 60. When the enabling signal on line 63 goes low, clock pulses appear on the shift line 64, as hereinafter described, and simultaneously shift the previously entered data serially out of the register 60 to line 65, while at the same time entering a one in stage zero. Then, after 16 signals have appeared on the shift line 64, the least significant bit is in stage 17 of the register 60, a zero is in stage 16 thereof, and ones are in stages zero through 15 of the register. At this time a 15 input AND gate (not illustrated) detects the presence of the ones in stages zero through 15 of register 60, and in response thereto produces a marker signal which appears on the line 67 leading from register 60.

The output of register 60 is connected by line 65 to the input of a comparator 70 (FIG. 2B), which is used to compare the codes developed by the generator 62 of a metering unit 22 with the code signals transmitted by the command unit 20. The transmitted code signals are picked up by a conventional receiver, which forms part of the RF circuits 26 (FIG. 1) of each unit 22, and are applied through line 71 to the input of its comparator 70. When a "strobe comparator" or enabling signal appears on the input line 72 to the comparator 70, the codes No. 1 and No. 2 of the unit 22 are compared with the code transmitted by the command unit 20. If the codes are alike a so-called "good signal" is produced on the comparator output line 74; if they are unlike, a so-called "bad signal" is provided on output line 75. These signals are then applied to sequencing logic described hereinafter.

The output signals developed on line 65 are also applied by a line 76 to one of the inputs of an AND gate 77, and by a line 78 to the input of a toggle flip-flop or parity generator 79.

At certain times after the stored codes of a unit 22 have compared favorably with a transmitted code, a data transmitting enabling signal appears on the other input line 80 to gate 77 to enable this gate, so that each time a data bit appears in line 65, a signal is developed on the output line 81 of the gate 77. Line 81 is applied to the input of an OR element 82, so that each signal that appears in line 81 gates element 82 and produces on its output line 84 a signal which is transmitted by the conventional radio frequency equipment 26 (FIG. 1) to the command station 20.

The parity generator 79 is used to give odd parity to each set of transmitted data. It initially is set by a signal on the reset line 85, so as to produce on line 86 a signal which forms one of the inputs of an AND gate 87. The other input to gate 87 is a parity transmitting enabling signal, which is developed on the input line 88 immediately following the transmission of data from each utility meter of a unit 22. Each time a data bit "one" appears on line 76, the toggle flip-flop 79 is switched from one to another of its two states. If an even number of data bit "ones" were previously transmitted through the gate 77, the flip-flop 79 returns to its original or reset state, in which an output signal is developed on its line 86, so that when the parity transmitting enabling signal appears on line 88, the gate 87 develops on line 89 a signal which gates OR element 82 to produce on line 84 a "one", or parity bit signal which is transmitted to the command station 20. On the other hand, if previously transmitted meter data had contained an odd number of "ones", the flip-flop 79 would have been in an off or zero state, so that no signal would be developed on its output line 86. Consequently, at the time that the enabling signal appeared on line 88 of the gate 87, there would be no signal on line 86, and gate 87 would therefore not be enabled, so that a "zero" or no signal would be transmitted to station 20 during the corresponding parity transmitting interval.

Referring now to FIG. 2A, 100 denotes a four bit binary counter, which has its four stages connected to the inputs of a binary to hexa-decimal converter 102. The counter 100 is capable of recording in binary form the decimal equivalents of from zero to 15 (binary 1111). Its contents increases the equivalent of one decimal each time it receives a sequence signal on its input line 103; and it is automatically reset or cycled back to zero once for every 16 signals on line 103. The counter 100 can also be reset or returned to zero by the application of a reset signal to its reset line 104.

The four stages or bits of the binary counter 100 are decoded by converter 102 into 16 different output signals, which correspond to 16 different sequences or operations of the associated unit 22. These 16 different signals, and the order in which they appear, are denoted in FIG. 2A at the converter output or sequence lines 0 through 15, inclusive. Thus, at the outset, assuming that counter 100 is in its zero state, a signal will appear on the sequence line 0 of the converter 102. When a signal next appears on the input line 103 of the counter 100, the latter causes the signal on sequence line 0 to be removed and to appear instead on the sequence or output line 1 of the converter. As successive signals appear on the line 103, the counter 100 causes the numerically next higher output line of the converter 102 to develop a signal, until all outputs 0 through 15 have been successively energized, and the counter 100 and converter 102 have been cycled back to their zero states. At this time the unit will be in its start or stand-by mode, and a signal will be present on line 0 of the converter 102.

The command unit 20, which may be carried by an airplane or other mobile vehicle, queries the metering units by simultaneously transmitting coded command signals together with coded clock signals CC, which enable the metering units simultaneously to compare their two codes with the transmitted code. Although all of the remote units 22 operate simultaneously at the start of a cycle to compare their codes with that of the transmitted code, it will be understood, of course, that for a given transmitted code, only one remote unit 22 will develop a "good" signal on the output line 74 of its comparator 70, and all of the rest of the remote units will develop "bad" signals on the output lines 75 of their comparators. As noted hereinafter, only that unit 22 which develops a "good" signal on its line 74, will transmit data to the command unit 20.

Since the code generator 62 of each metering unit is capable of developing a thirty-four bit code in two seventeen bit groups (codes No. 1 and No. 2) millions of units 22 may be assigned separate codes; and the command unit 20 can be programmed to transmit these millions of codes to units 22, one after another in one or more cycles. Moreover, the command unit 20 transmits the numerous codes intermittently, so that between successively transmitted codes, there will be an interval of time during which the command unit will be free to receive data transmitted to it by the metering unit 22, which was triggered or actuated by the last transmitted code.

Figure 3:
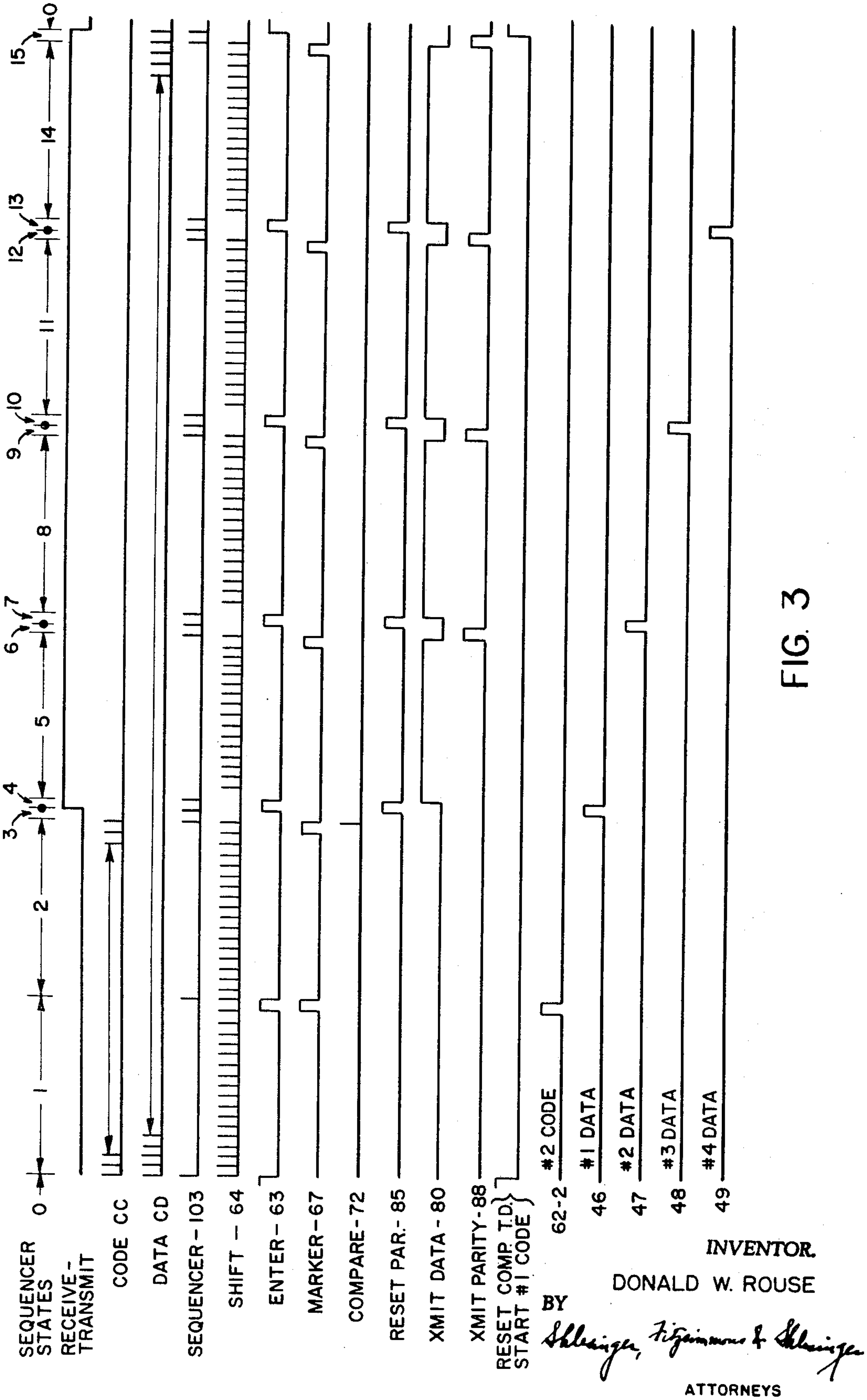
FIG. 3 is a timing diagram illustrating the sequence of events which occur, when the illustrated meter unit is queried by the command unit.

By way of example, let it be assumed that the command unit 20 commences to transmit a new code approximately every 140 milliseconds. At the same time that it commences to transmit a code, unit 20 also starts to transmit 35 code clock signals CC at intervals of say, 1 millisecond (FIG. 3). Thirty-four milliseconds after the appearance of the first clock signal CC, the clock signals stop, and do not reappear until say, some 106 milliseconds later, when the next code is transmitted by the command unit 20.

As shown in FIG. 1, each unit 22 has its own power supply, which drives a data clock (not illustrated), which continuously develops a data clock signal CD (FIGS. 2A and 3). These signals CD are always present (FIG. 3), and appear at the the same intervals as the transmitted code clock signals CC.

At the start of a cycle in which the command unit 20 begins to transmit a given code, if the illustrated unit 22 is coded to respond to the code transmitted by the command unit, the sequence control counter 100 will be in its zero state, thereby producing a signal on the 0 sequence line of the converter 102 (FIG. 2A). The signal on the 0 sequence line is applied to the input of an OR gate 110, which develops on its output line 111 a signal which gates or enables a further OR gate 112, the output of which leads to an inverter 113. Upon receiving the signal from gate 112, the inverter 113 switches the mode of operation of the RF circuits 26 in the metering unit 22 to a "receiving" state, so that signals transmitted by the command unit 20 can be picked up by the unit 22. The signal on the 0 sequence line also resets the comparator 70 (FIG. 2B), and applies an enabling signal through line 62–1 to the code generator 62, so that the No. 1 code can be "strobed" (shifted) out of the generator to the shift register 60. It also enables an OR gate 106 (FIG. 2A), and produces on line 107 a signal which enables an OR gate 108 (FIG. 2A), thus producing on line 63 (FIGS. 2A, 2B and 3) an enabling signal which permits the parallel entry of the No 1 code from the generator 62 into the shift register 60.

Coincident with the leading edge of the first code clock signal CC received by the unit 22, the signal on line 111 combines with the code clock signal to enable an AND gate 115 (FIG. 2A), the output of which then enables an OR gate 116 to produce a shift signal on line 64. This assures that there will be a zero in the zero stage of register 60 at the start of a cycle.

At the same time, the signal on line 107 combines with the first code clock signal CC to enable an AND gate 118 (FIG. 2A), the output of which enables an OR gate 119, which produces a momentary sequence signal on line 103, thus causing the counter 100 to effect a sequence change in the converter 102, so that the output signal of the converter is removed from the 0 sequence line, and applied to the number 1 sequence line.

On the trailing edge of this first code clock signal CC, and after the shift signal has expired from line 64, the No. 1 code is transferred from the code generator 62 into stages one through 17 of the shift register 60, a zero already having been entered in the zero stage of this register. This transfer of the No. 1 code thus occurs as the "enter" signal on line 63 goes low, or disappears as the result of the removal of the signal from the zero sequence line, and the consequent blocking of the OR gate 106.

Coincident with the transfer of the code on the trailing edge of the first code clock signal CC, a time delay unit 121 (FIG. 2B), which is connected to the 0 sequence line, is started. This time delay is selected to run, for example, between a minimum of 102 milliseconds and a maximum of 132 milliseconds, before producing a signal on its output line 122. When a signal does appear on line 122, it enables an OR gate 124, the output of which is connected to the reset line 104 of the sequence counter 100 for a purpose described hereinafter.

After the entry of the No. 1 code into the shift register 60, and the starting of the time delay unit 121, the signal on sequence line 1 maintains the OR gate 110 (FIG. 2A) enabled, thus providing on line 111 a signal which partially enables the AND gate 115, and fully enables the OR gate 112, so that the RF circuits 26 of the unit 22 are maintained in their "receiving" mode. Consequently each of the next 16 code clock signals CC causes momentary gating of the elements 115 and 116, producing 16 successive shift signals on line 64. These shift signals cause the No. 1 code in the shift register 60 to be shifted, most significant bit first, serially out of the register 60 on line 65 and into the comparator 70 simultaneously with the entry of the first 16 bits of the transmitted code into the comparator through line 71.

At the end of the 16 clock pulses CC following the first such clock pulse, the least significant bit of the No. 1 code is in stage 17 of the shift register 60, a zero is in stage 16 thereof, and ones are in stages zero through 15 of register 60. This, as noted above, produces the marker signal on the output line 67 of the shift register, thereby enabling an AND gate 126 (FIG. 2A). The output of this gate produces a No. 2 code enabling signal on line 62–2, and through line 127 (FIG. 2A) also enables the OR gate 106. This gate develops on line 107 a signal, which gates element 108 to produce on line 63 an enabling signal for entering code No. 2 into register 60, and which also partially enables the AND gate 118.

Therefore, the next time a code clock signal CC appears (the 17 signal following the initial signal), its leading edge produces a further shift signal, which shifts the seventeenth code bit out of the register 60 into the comparator 70; and the trailing edge of this signal effects the transfer of the No. 2 code from the generator 62 into bits one through 17 of the shift register 60. The trailing edge of this signal also enables the gate 118, and consequently the gate 119, so that a sequence signal is developed on line 103, whereby the counter 100 causes the signal to be removed from sequence line 1 of converter 102, and to be applied instead to the sequence line 2. As in the case of the signals to the 0 and 1 sequence lines, the signal on sequence line 2 maintains the gate 110 enabled, so that the signal on line 111 partially gates element 115, and fully gates element 112, so that the RF circuits 26 remain in their "receiving" mode. The signal on sequence line 2 also partially gates AND elements 130 and 131 (FIG. 2A).

Under these circumstances, the next 16 code clock signals CC will produce 16 shift signals on the line 64 so that the No. 2 code in the register 60 is shifted serially out of the register and into the comparator 70. When the least significant bit of the No. 2 code is in stage 17 of the register 60, the marker signal is again produced on line 67, thereby completing two of the three inputs to the AND gate 130. When the next code clock signal CC appears, a shift signal is developed in line 64 to advance the last bit of the No. 2 code into the comparator 70, and simultaneously to fully enable the gate 130, which produces a "compare" signal on line 72 (FIGS. 2A, 2B and 3).

During the serial entry of the No. 1 and No. 2 codes into the comparator 70 from register 60, the transmitted code signals from unit 20 were also entered serially and compared bit by bit with the corresponding bits of the stored, or identifying codes No. 1 and No. 2. If when the "compare" signal appears on the line 72 there was any difference between the transmitted and stored code bits, respectively, the comparator will produce a signal on its output line 75, thereby indicating a "bad" comparison—i.e. that the 34 bit code transmitted by the control unit 20 is not identical to the 34 bit code represented by codes No. 1 and No. 2. In such case the signal on line 75 enables the OR gate 124 (FIG. 2B) and produces a reset signal on line 104, which causes the sequence counter 100 to be returned to its zero position. This interrupts the operation of the consumer unit 22, which then remains dormant until the next code is transmitted by the command unit 20.

If, on the other hand, the code transmitted by the command unit 20 is identical to that represented by the bits of the two stored codes No. 1 and No. 2 of the unit 22, then at the time of the appearance of the "compare" signal on line 72 the comparator 70 produces on its output line 74 a signal indicating a "good" comparison. This signal fully enables the gate 131 (FIG. 2A), which in turn produces on its output 132 a signal which gates the element 119, thereby producing a sequence signal on line 103. This signal causes the sequence counter 100 to advance the converter 102 to its next stage, so that the converter output signal is removed from the sequence line 2 and applied instead to the sequence line 3.

Removal of the signal from sequence line 2 also disables gates 130, 131 and 110. The consequent removal of the signal from line 111 disables gate 115, but does not interfere with the "receiving" mode of the RF circuits 26, since the gate 112 is now directly enabled by the signal on the sequence line 3. This latter signal also enables an OR gate 134, the output of which is applied by line 135 to one of the inputs of an AND gate 136 (FIG. 2A).

The code clock signals CC are now terminated (FIG. 3), but the sequencing continues under the control of the clock signals CD. Consequently with the appearance of the next signal CD following the energization of the sequence line 3, the gate 136 is fully enabled producing on line 137 a signal which gates the element 119, thereby producing another sequence signal on line 103. The sequence counter 100 thus causes the converter 102 to switch its output signal from the sequence line 3 to the sequence line 4, thereby disabling gate 112 so that the RF circuits are switched from the "receiving" to a "transmitting" mode, and also disabling gates 134, 136 and 119.

The signal on the sequence line 4 gates an OR element 140 (FIG. 2A), thus producing on its output line 141 a signal which gates the elements 134 and 108, and which also is connected to the parity generator reset line 85, so that the generator 79 is reset to produce a signal on its output line 86. Gate 134 partially enables gate 136; gate 108 produces an "enter" enabling signal on line 63 so that data can be entered into the shift register 60; and the signal on sequence line 4 is also applied to the data enabling line 46, which permits data to be transferred from counter 41 to the shift register 60. Therefore at the next appearance of a data clock signal CD, gate 136 is fully enabled, thus enabling gate 119 and producing a sequence signal on line 103, and causing converter 102 to shift its output from sequence line 4 to sequence line 5.

When the signal is removed from sequence line 4, the data enabling signal is removed from line 46, the gate 108 is blocked to remove the enabling signal from line 63, and the gate 134 is blocked to disable gate 136. Upon the falling edge of the enabling signal on line 63, the data in counter 41 is transferred into bits of one through 17 of the shift register 60, while a zero is entered into the zero stage of this register. The signal on the sequence line 5 now enables an OR gate 143 (FIG. 2A), thereby developing on its output line 144 a signal, which partially enables AND gates 145 and 146 (FIG. 2A), and which applies a data transmitting signal through line 80 to one of the inputs of the AND gate 77 (FIG. 2B).

With the data from counter 41 now in the shift register 60, the next 16 data clock signals CD intermittently enable gate 146, and consequently gate 116, thus producing sixteen shift signals on line 64, so that the data in register 60 is shifted, in a manner similar to that noted above, out of the register 60 to the output line 65.

Each such bit shifted onto line 65 is also applied through line 78 to the parity generator 79, and through line 76 to the other input of the AND gate 77 which is thus fully enabled. In this manner each data bit shifted out of the register 60 is applied through the gate 77 and its output line 81, and through the OR gate 82 to the data transmitting line 84, for transmission by the RF circuits 26 to the control unit 20.

After 16 data bits have been shifted out of register 60 and transmitted to the command station 20, the marker signal is produced on line 67, thereby fully enabling gate 145 (FIG. 2A), which in turn enables gate 134, and which partially enables gate 136. Then, upon the appearance of the next clock signal CD, gates 146 and 116 are enabled to produce a shift signal on line 64 to shift out the last or 17the data bit from the register 60 for transmission to the control unit 20; and the gates 136 and 119 are also enabled by this clock signal so as to produce a sequence signal on line 103. This sequence signal causes the converter 102 to remove its output signal from the sequence line 5, and to apply the signal to the sequence line 6.

The removal of the signal from sequence line 5 disables the gate 143, thereby removing the enabling signal from the data transmitting line 80; and the signal on sequence line 6 enables an OR gate 148 (FIG. 2A), the output of which applies a signal to the parity transmitting line 88. Line 88 provides one of the two inputs to the AND gate 87 (FIG. 2B). The other input 86 to this gate may or may not at this time have a signal applied thereto from the output of the parity generator 79. As noted above, if the previously transmitted data bits (17) from the counter 41 had an even number of data ones there will be a signal at this time on the line 86. On the other hand, if the previously transmitted data had an odd number of ones, there will be no signal at this time on the line 86. Therefore, whether or not at this time the AND gate 87 is enabled to transmit a signal (one) through the gate 82 to the command unit 20, will depend entirely upon the data that was transmitted from counter 41.

In addition to enabling the transmission of the parity signal, the output of the OR gate 148 enables the gate 134, so that upon the next appearance of a clock signal CD, the gates 136 and 119 are again enabled to produce a sequence signal 103, which operates to remove the signal from the sequence line 6, and to apply it instead to the sequence line 7 (FIG. 2A). With the removal of the signal from the sequence line 6 of the gate 148 is disabled, so that the parity transmitting signal is removed from line 88. Also at this time the signal on sequence line 7 enables gate 140, the output 141 of which applies a signal to the parity reset line 85, which also applies a signal to the enabling line 47 of data counter 42, and which also enables gate 108 to produce an enabling signal on line 63 for entering the data from counter 42 into the shift register 60. At this time the signal on line 141 also enables gate 134, so that at the appearance of the next clock signal CD, the gates 136 and 119 are again enabled to produce on line 103 a sequence signal which shifts the output signal of converter 102 from sequence line 7 to sequence line 8.

In a manner that will be apparent from what has been described above, the data in counter 42 is transferred to the shift register 60 on the trailing edge of the enabling signal on line 63, this signal being removed upon the switching of the output signal from the sequence line 7 to the sequence line 8 of converter 102. Thereafter, also as will be apparent from the above discussion, the data from counter 42 is shifted serially out of the register 60 and transmitted to the command unit 20, after which a parity signal "one" may or may not be transmitted to unit 20 depending upon the number of "ones" in the data received from counter 42.

In a similar manner the data from the counters 43 and 44 is transmitted to the command unit 20 under the control of the clock signals developed by clock D.

After the last bit of data from the counter 44 has been transmitted to unit 20, a sequence signal on line 103 (see FIG. 3) removes the signal from the sequence line 14 and causes it to be applied to the sequence line 15. This enables gate 148, so that the enabling signal is applied to the parity transmitting line 88, and so that the gate 134 is enabled. Then at the appearance of the next clock signal CD, the gates 136 and 119 are enabled to produce a sequence signal on line 103, which returns the counter 100 to its zero state, thereby once again applying a signal to the 0 sequence line of the converter 102.

This completes the normal transmitting cycle of the unit 22. The total time for effecting this cycle — (i.e.) the time between the appearance of the first code clock signal CC, and the ultimate return of the counter 100 to its zero setting) is, for example, approximately 92.5 milliseconds. Consequently the time delay unit 121, which was previously started or initiated upon the change from the 0 to the 1 sequence of the converter 102, has not as yet timed out, because its minimum delay time (approximately 102 milliseconds) is greater than the overall time required to complete the normal cycle. However, the maximum delay time of the timer unit 121 is 132 milliseconds, so that before the next code is transmitted by the remote unit 20, which transmits approximately every 140 milliseconds, the timer will have counted out, and will have produced on its output line 122 a signal that produces a reset signal on line 104 of counter 100. Since, however, under normal circumstances the counter 100 will have normally been set to zero, the signal produced by the time delay unit will have no effect on the remote unit 22. However, in event that during the normal cycle the logic of the unit 22 for some reason fails to energize all of the sequences 1 through 15, then at some time before the next command is transmitted from the control unit 20, the time delay will have counter out and will have reset the sequencing control counter 100 to its zero state.

From the foregoing it will be apparent that the instant invention provides an extremely compact and reliable system for monitoring rapidly and successively, millions of remote meter recording units from a single, movable command unit. Since the data stored in the counters 41 to 44 is transitory, the monitor 59 is used to prevent destruction of stored data in the event of a power failure. The condition of its associated battery is continually monitored. A weak battery condition, as noted above, is translated into a unique data value (greater than 99,999) as an error message. A second error message is generated when counter data is updated or changed at the time the data is being transferred from a data register to the shift register. When this latter error signal is detected at the command unit 20, the unit will repeat the same code to requery the same remote unit, before transmitting a code for a different remote unit. By combining the four bit binary counter 100 with the binary to hexadecimal converter 102, the numerous sequences (zero to 15) can be coded for extremely rapid and sequential operation in response to signals originating from both the control unit 20 and from the data handled by the shift register 60 and comparator 70. Moreover, by recording the meter data in binary form at each unit 22, and then transmitting the data in binary form to the command unit 20, the meter data is readily recordable on magnetic tape at the command unit. Also, by entering the 34 bit identifying code of each unit 22 in two successive portions (denoted codes No. 1 and No. 2) into the associated register 60, the need for using a 34 bit shift register at each consumer unit 22 is obviated.

Having thus described my invention, what I claim is:

1. The method of selectively transmitting to a single command station the values indicated by a plurality of utility meters located at each of a plurality of consumer stations remote from said command station, comprising the steps of storing a different bit code at each consumer station, continuously accumulating the meter values at each consumer station in data bit form, intermittently transmitting from said command station a plurality of different bit codes, each of which transmitted codes corresponds to only one of the codes stored at said consumer stations, simultaneously comparing at each consumer station its stored code with each successive code transmitted from the command station, and during an interval between transmission of said intermittently transmitted codes, transmitting in signal form to the command station, the accumulated data bits from the consumer station whose stored code agrees with the last-transmitted code.

2. The method as defined in claim 1, including separately recording the accumulated data signals of each meter at each consumer station in bit form, and successively transmitting to the command station during said interval the separately recorded data signals of each meter of the consumer station whose stored code agreed with the last-transmitted code.

3. The method as defined in claim 2, including during the transmission of data signals from a consumer station, developing an error signal when the value indicated by the associated utility meter changes, and transmitting this error signal with the last-named data signals for detection at the command station.

4. Apparatus for transmitting data signals selectively from a plurality of consumer stations to a command station, which intermittently transmits a plurality of different signal codes, comprising means for continuously recording data in signal form at each of said consumer stations, means for storing a different signal code at each of said consumer stations, means at each of said consumer stations for intermittently receiving said plurality of different signal codes transmitted from said command station, means for placing all of said consumer stations in a signal receiving mode prior to the transmission of each code from said command station, means for simultaneously comparing each transmitted code with the stored codes of said consumer stations, means responsive to said comparing means to switch each consumer station one at a time to a signal transmitting mode, when the stored code of a consumer station corresponds to the last code transmitted from said command station, and means operative to transfer data from the recording means of a consumer station to said command station, when the consumer station is in its signal transmitting mode.

5. Apparatus as defined in claim 4, including sequencing means at each of said consumer stations, responsive to each code transmitted from said command station, to transfer the stored signal code of each consumer station to said comparing means for comparison with the transmitted code, said comparing means being operative, when the codes compared thereby agree, to produce a first signal, and operative, when the codes compared thereby disagree, to produce a second signal, means responsive to said first signal to switch the associated consumer station to its signal transmitting mode, and means operative in response to said second signal to maintain said associated consumer station in its signal receiving mode.

6. Apparatus for selectively transmitting to a single command station, which intermittently transmits a plurality of different bit codes, the cumulative quantities of items consumed at consumer stations remote from said command station, comprising means at each of said consumer stations for continuously recording in data bit form, the cumulative quantity of an item consumed at that consumer station, means for storing a different bit code at each of said consumer stations, each of said stored codes corresponding to a different one of said codes transmitted by said command station, means at each consumer station for comparing its code with each code transmitted by said command station, and sequencing means at each consumer station responsive to said comparing means, and operative when the stored code of a consumer station corresponds to the code last transmitted by said command station, to effect transmission of the recorded data bits of that particular consumer station to said command station in the interval between said last transmitted code and the next code transmitted by said command station.

7. Apparatus as defined in claim 6, wherein said sequencing means comprises means for selectively placing each of said consumer stations in signal receiving and transmitting modes, respectively, means normally maintaining said consumer stations in their signal receiving modes, thereby to enable said consumer stations to receive the code signals transmitted by said command station, and means operative to switch each consumer station to its transmitting mode only when the stored signal code of a consumer station corresponds to the code last transmitted from said command station.

8. Apparatus as defined in claim 6, wherein said code storing means comprises a multi-stage code generator at each of said consumer stations, said comparing means comprises a bit comparator at each consumer station, and having a pair of serial inputs, one of which is disposed to receive in bit form the code signals transmitted by said command station, and said sequencing means includes means responsive to each code transmitted by said command station to effect transfer of the stored code in bit form from the associated generator to the other serial input of the associated comparator simultaneously with the entry of the transmitted code into said one input.

9. Apparatus as defined in claim 8, wherein said sequencing means further includes means normally maintaining the associated consumer station in a signal receiving mode, whereby the code signals transmitted by said command station are received and applied simultaneously to said one input of each comparator, and means operative to switch the mode of a consumer station from signal receiving to signal transmitting, when the codes applied to the inputs of its comparator agree.

10. Apparatus as defined in claim 9, wherein at each consumer station each of said generators has a parallel output, a multi-stage shift register is interposed between each of said generators and the associated comparator, and each of said registers has a parallel input connected to a parallel output of the associated code generator, and a serial output connected to said other input of the associated comparator.

11. Apparatus as defined in claim 7, wherein said recording means at each remote station comprises a multi-stage bit counter having an input for receiving a data signal each time a predetermined quantity of the associated item is consumed, and said sequencing means further includes means for transferring data bits out of the associated counter for transmission as data signals to said command station, when the mode of the associated remote station changes from signal receiving to signal transmitting.

12. Apparatus as defined in claim 11, including means operative, when during the transfer of data bits from a counter the latter receives a signal on its input, to develop a coded error signal in said data bits for transmission therewith to said command station.

13. Apparatus as defined in claim 12, including a direct current battery at each of said consumer stations for supplying power thereto, and means for monitoring the power of said battery at each station and operative, when the power of a battery falls below a set value, to develop a second coded error signal in the data bits of the associated counter, when the last-named bits are transmitted to said command station.

14. Apparatus as defined in claim 11, including a multi-stage shift register at each of said consumer stations having a parallel input connected to the output of the associated counter, and having a serial output connected to a signal transmitting line, and said transferring means includes means operative, when the associated consumer station is switched to its transmitting mode, successively to transmit data signals in parallel from said counter to said register, and to shift the transferred data signals serially from said register to said transmitting line during the interval between two successive code signals transmitted by said command station.

15. Apparatus as defined in claim 14, wherein said code storing means comprises a code generator at each consumer station having a parallel output connected to the input of said register, said code comparing means comprises a comparator at each consumer station having a first input for receiving transmitted codes serially in bit form, and having a second input connected to the output of the associated register, said sequencing means includes means operative, each time a signal code is transmitted from said command station, successively to transfer the stored code signals at each consumer station in parallel from the associated code generator to the associated register, and to shift the transferred code signals serially from said associated register to said second input of the associated comparator.

16. Apparatus for monitoring from a single command station, which intermittently transmits a plurality of different bit codes, a plurality of utility meter stations, each of said meter stations including a plurality of separate utility meters, comprising a plurality of identical multi-stage bit counters at each remote station, each of said counters having an input operatively connected continuously to one of the utility meters of the associated station to receive therefrom an updating signal each time the associated meter has detected the consumption of a predetermined quantity of the item it is measuring, a multi-bit code generator at each of said meter stations, each of said generators storing a different bit code, which corresponds to only one of said transmitted codes, a code comparator at each meter station having a first input for receiving each transmitted code in bit form, and sequencing means at each meter station operative each time a transmitted code is applied to said first input of said comparator, to transfer the stored code of the associated meter station to a second input of the associated comparator for comparison with the transmitted code, said sequencing means including means operative between the intervals of the codes transmitted by said command station successively to transfer data signals from the counters of a meter station for transmission to said command station, when the codes applied to the first and second inputs of the associated comparator agree.

* * * * *